United States Patent [19]
McClure et al.

[11] Patent Number: 5,479,767
[45] Date of Patent: Jan. 2, 1996

[54] TRASH BAFFLE FOR ROUND BALER

[75] Inventors: John R. McClure, New Holland; Steven C. Schlotterbeck, Leola, both of Pa.

[73] Assignee: New Holland North America, Inc., New Holland, Pa.

[21] Appl. No.: 311,656

[22] Filed: Sep. 23, 1994

[51] Int. Cl.[6] .......................... A65B 11/04; A01D 39/00
[52] U.S. Cl. ................. 56/343; 53/118; 53/587; 53/389.2; 100/15
[58] Field of Search ................ 56/341, 343; 53/118, 53/389.1, 389.2, 389.3, 587; 100/5, 15, 88

[56] References Cited

U.S. PATENT DOCUMENTS 4,599,844  7/1986  Clostermeyer et al. .............. 56/343 X
4,956,968  9/1990  Underhill .................................. 56/341
5,243,806  9/1993  Jennings .................................. 53/118

*Primary Examiner*—David J. Bagnell
*Attorney, Agent, or Firm*—Frank A. Seemar; Larry W. Miller

[57] ABSTRACT

An agricultural baler for making cylindrical bales of crop material. The baler includes a sledge assembly moveable between core starting and full bale positions. A plurality of rollers on the sledge assembly cooperate with an apron to define a bale forming chamber. Wrapping is accomplished via a system that includes a dispensing mechanism carried on the sledge assembly for dispensing sheet material, such as net or the like, into the bale forming chamber whereupon it is wrapped circumferentially around a formed cylindrical package of crop material as it is rotated in the chamber. A baffle is mounted on the dispensing mechanism between the sheet material and the bale forming chamber to shield the sheet material from stray crop material and other debris.

10 Claims, 4 Drawing Sheets

TRASH BAFFLE FOR ROUND BALER

FIELD OF THE INVENTION

This invention relates generally to a baler for forming net wrapped cylindrical bales of crop material, commonly referred to as a round baler. More particularly, this invention pertains to a trash baffle for shielding the net dispensing mechanism of a round baler.

BACKGROUND OF THE INVENTION

Prior art round balers generally have a bale forming chamber defined by an apron comprising an array of side-by-side belts, transverse slats trained on chains, a plurality of rolls or a combination of these various elements, e.g., rolls and belts. Crop material, such as hay, is picked up from the ground, as the baler travels across the field, and is fed into a fixed or expandable chamber where it is rolled up to form a compact cylindrical package of crop material. While still inside the bale forming chamber in its compacted form, the outer surface of the package is wrapped with twine or web material, such as net, prior to ejecting the wrapped bale from the chamber onto the ground for subsequent handling.

Exemplary of prior art round balers of the general type mentioned above is the baler disclosed in U.S. Pat. No. 4,956,968 issued in the name of K. R. Underhill on Sep. 18, 1990. In this baler an apron consisting of a combination of rolls and belts is used for bale formation. The baler also includes a mechanism for supplying net to a dispensing assembly which in turn feeds the net material into the bale forming chamber for circumferentially wrapping a formed cylindrical package of crop material.

The dispensing mechanism includes a net insertion arrangement having a grasping portion for pulling net from the supply mechanism and inserting the free edge, commonly referred to as the tail, into the chamber. It is important that this tail be of adequate length to assure initiation of the wrapping operation, i.e., when the tail is placed in the chamber it must be of sufficient length to reach the nip between the cylindrical crop package and the bale forming elements that rotate the package during wrapping. As the package is rotated the tail is pinched in the nip which pulls the net along the outer surface of the crop package to effect the dispensing action.

Subsequent to wrapping, the net material is severed by a cutting device, comprising an assembly for thrusting a knife edge transversely through the path of the net. As dispensing continues, net tension increases causing a severing action as the net is pulled against the knife edge. After the net material is severed, the completed round bale is ejected from the baler by lifting the tail gate which opens the chamber rearwardly permitting the bale to be discharged onto the ground behind the baler.

Problems have been encountered when trash, such as stray crop material and other debris from the surface of the crop material package is permitted to engage the net prior to its entry into the dispensing mechanism. These problems become especially acute in balers of the type disclosed in the Underhill patent mentioned above where the net dispensing assembly is in close proximity to rolls that are used to define the chamber in which hay is being formed into a compressed cylindrical package of crop material. In a system of this nature, a buildup of trash could worsen the starting and spreading functions of the net dispenser, leading to reduced performance and in some instances downtime of the baler for time consuming service and costly repair.

SUMMARY OF THE INVENTION

An important object of the present invention is to provide improved net dispensing apparatus for a round baler that enhances the reliability and thereby improves the overall performance.

In pursuance of this and other important objects the present invention provides for a new and unique improvement to round baler apparatus having a main frame, a tailgate pivotally connected to the main frame, and a sledge assembly mounted on the main frame for movement between a bale starting position and a full bale position, wherein the sledge assembly includes a conveyor mechanism having a crop engaging surface extending transversely of the main frame. The baler apparatus further includes an apron movably supported along a continuous path on the main frame and on the tailgate, wherein the apron path has an inner course that cooperates with the rollers of the sledge assembly to define a bale forming chamber, a pickup for feeding crop material into the chamber, and dispensing means carried on the sledge assembly for dispensing sheet material into the bale forming chamber so that the sheet material is wrapped circumferentially around a cylindrical package of crop material contained in the bale forming chamber to form a bale. The dispensing means is pivotally mounted on the sledge assembly for movement between an extended position at which sheet material is dispensed into the bale forming chamber and a retracted position. More particularly, the present invention contemplates a baler of the general configuration described above and having baffle means mounted on the dispensing means so as to be disposed between the sheet material and the at least one roller under conditions where the dispensing means is in the extended position, to effectively shield the sheet material from stray crop material and other debris.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
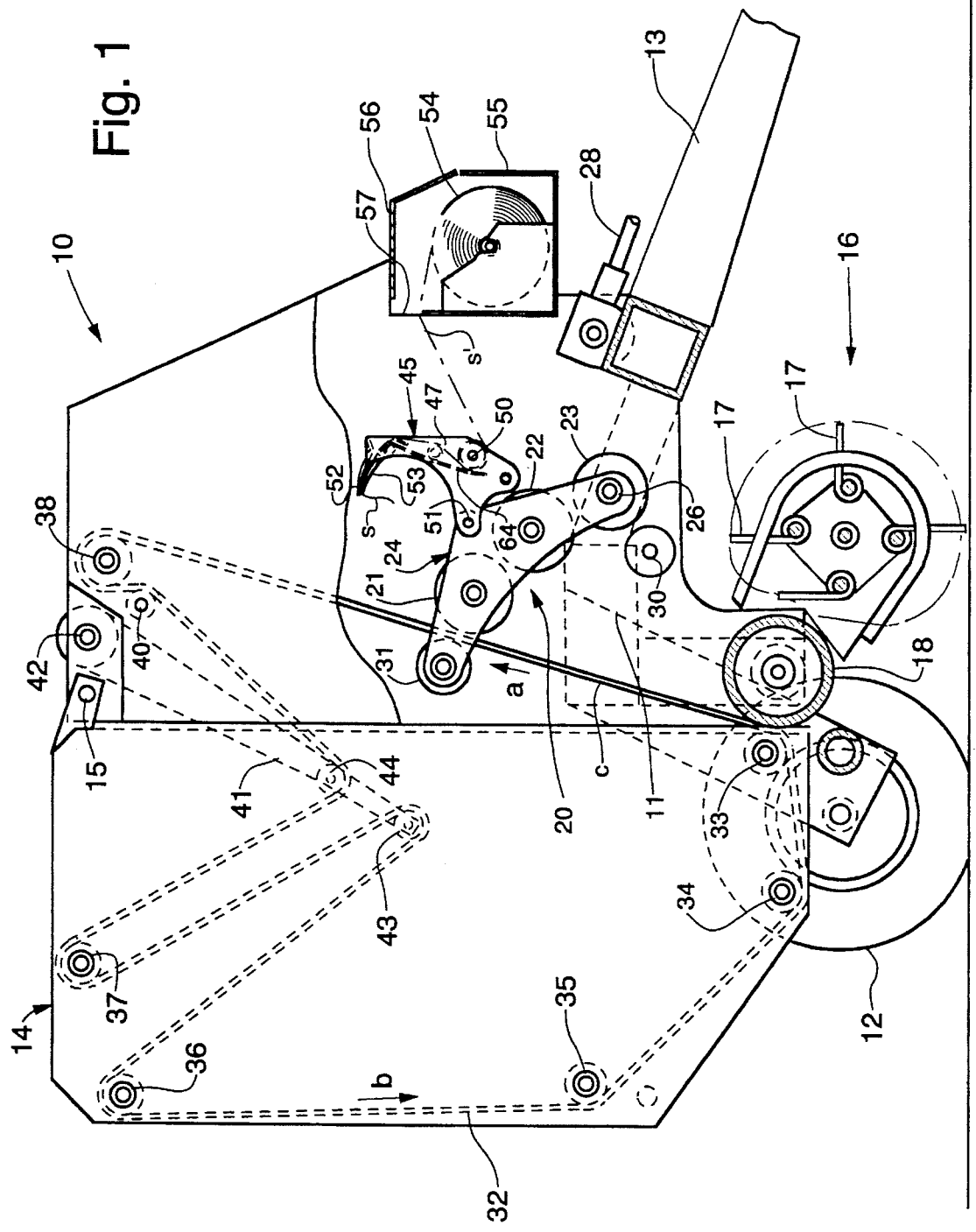
FIG. 1 is a diagrammatic side elevational view of a round baler in which the improved net dispensing apparatus of the present invention is embodied.

Referring now to the drawings for a more detailed description of the preferred embodiment of the present invention, FIG. 1 shows a round baler 10 of the type disclosed in U.S. Pat. No. 4,956,968, discussed above and hereby incorporated by reference. The present invention is directed to an improvement to net dispensing apparatus for round balers of the general type disclosed in U.S. Pat. No. 4,956,968.

Figure 2:
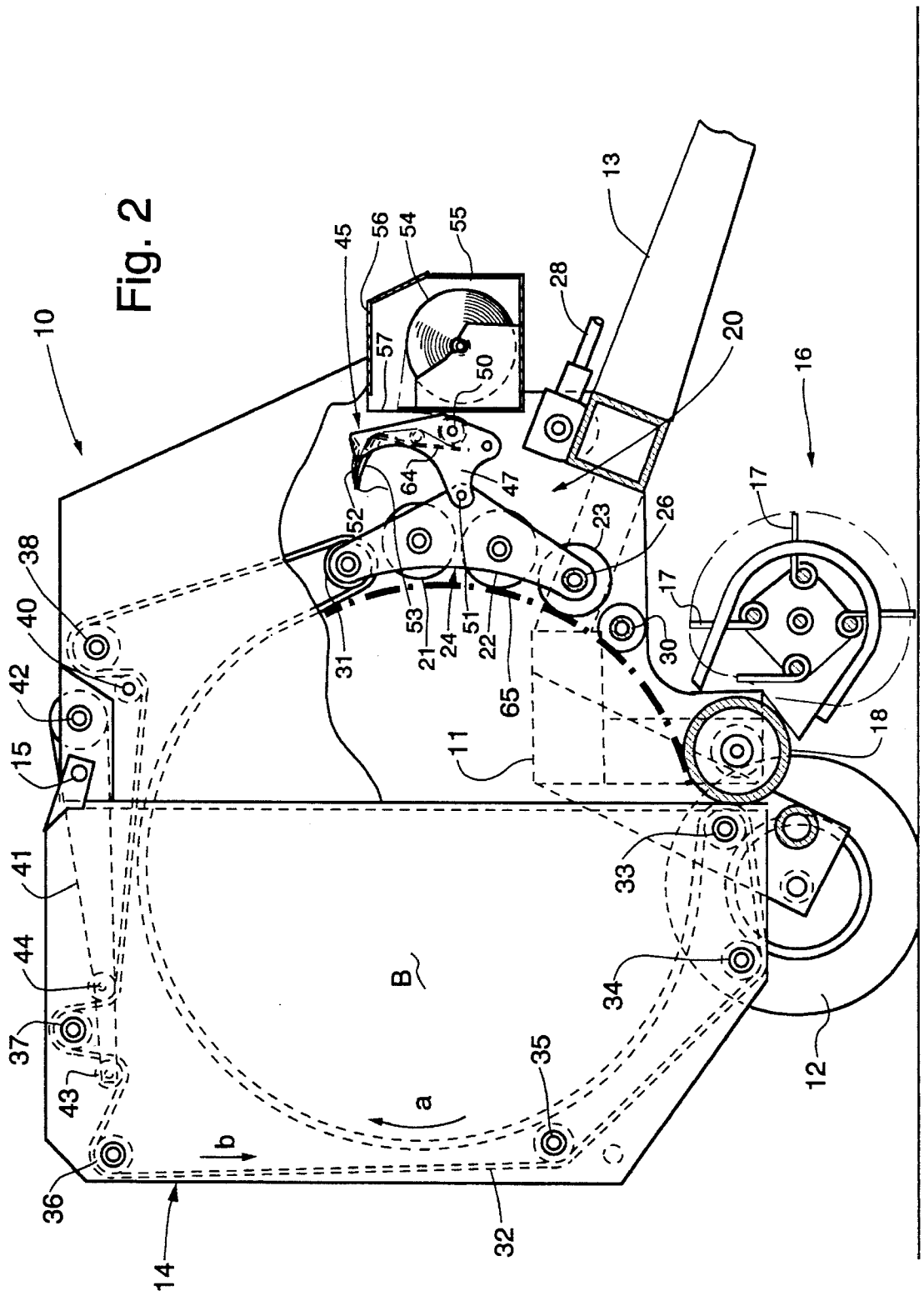
FIG. 2 is a diagrammatic side elevational view similar to FIG. 1 and shows the baler components in the full bale position.

Round baler 10 includes a main frame 11 supported by a pair of wheels 12 (only one shown). A tongue 13 is provided on the forward portion of main frame 11 for connection to a tractor. Pivotally connected to the sides of main frame 11 by a pair of stub shafts 15 is tailgate 14 which may be closed (as shown in FIGS. 1 and 2) during bale formation or pivoted open about stub shafts 15 to discharge a completed bale. A conventional pickup 16, mounted on main frame 11, includes a plurality of tines 17 movable in a predetermined path to lift crop material from the ground and deliver it rearwardly toward a floor roll 18, rotatably mounted on main frame 11.

The bale forming chamber is defined partly by a sledge assembly 20 comprising a plurality of rollers 21, 22, 23 extending transversely of the main frame 11 in an arcuate arrangement, journalled at their respective ends in a pair of spaced apart roll carrying arms 24. These arms are pivotally mounted within the walls of main frame 11 on stub shafts 26 for providing movement of sledge assembly 20 between the bale starting position shown in FIG. 1 and the full bale position shown in FIG. 2. Rollers 21, 22, 23 are driven in a counter-clockwise direction as viewed in FIGS. 1–4 by conventional means connected with a drive shaft 28 which is in turn connected to the power-take-off of a tractor. A starter roll 30 is located adjacent roller 23 and is also driven counter-clockwise. A freely rotatable idler roller 31, carried at the distal end of arms 24, moves in an arcuate path with sledge assembly 20 as it moves between its bale starting position (FIG. 1) and full bale position (FIG. 2).

The bale forming chamber is further defined by a conventional apron 32 comprising a plurality of continuous side-by-side belts supported by guide rolls 33, 34, 35, 36, 37 rotatably mounted in tailgate 14. Apron 32 is also supported on a drive roll 38, rotatably mounted on main frame 11. Although apron 32 passes between roller 21 on sledge assembly 20 and idler roller 31, it is in engagement only with idler roller 31 and not roller 21, which is located in close proximity to the apron belts for the purpose of striping crop material from the belts. Suitable means couple drive shaft 28 to drive roll 38 to provide rotation in a direction causing movement of apron 32 along its path in a direction indicated by arrows a and b in FIGS. 1 and 2. An additional guide roll 40 in the main frame 11 ensures proper driving engagement between apron 32 and drive roll 38. A pair of take up arms 41 pivotally mounted on main frame 11 by a cross shaft 42 for movement between inner and outer positions shown in FIGS. 1 and 2, respectively. Take up arms 41 carry additional guide rolls 43, 44 for supporting apron 32. Resilient means, such as coil springs (not shown), are provided to normally urge take up arms 41 toward their inner position (FIG. 1) while resisting movement thereof to their outer position (FIG. 2).

When the elements of round baler 10 are disposed in the condition shown in FIG. 1 with tailgate 14 closed, an inner course c of apron 32 extends between lower front guide roll 33 and idler roll 31, and rollers 21, 22, 23 are inclined rearwardly on sledge assembly 20 to define the initial bale forming chamber, or as sometimes referred to, the core starting chamber. Apron inner course c forms the rear wall of the chamber while the inwardly facing moving peripheral surfaces of rollers 21, 22, 23 define a rearwardly inclined cooperating front wall. Floor roll 18 generally defines the bottom of the chamber between such front and rear walls, and starter roller 30 is spaced from floor roll 18 to form a throat or inlet for the chamber, through which crop material is fed.

As round baler 10 is towed across a field, pickup tines 17 lift crop material from the ground and deliver it through the throat and thence into the bale forming chamber of baler 10. The crop material is carried rearwardly by floor roll 18 into engagement with apron inner course c (FIG. 1) which urges it upwardly and slightly forwardly into engagement with rollers 21, 22, 23. In this manner crop material is coiled in a generally clockwise direction, as viewed in FIG. 1, to start a bale core. Continued feeding of crop material into the bale forming chamber by pickup tines 17 causes the apron inner course c to expand in length around a portion of the circumference of the bale core as the diameter increases. Take up arms 41 rotate from their inner position shown in FIG. 1 toward their outer position shown in FIG. 2 to provide for expansion of the inner course of the apron in a well known manner, i.e., in effect the outer course of the belts of apron 32 are diminished in length while the inner courses increase in a like amount. After a cylindrical package of crop material has been formed and wrapped with sheet material, tailgate 14 is opened and the bale is ejected rearwardly. Subsequent closing of tailgate 14 returns the apron inner and outer courses of the belts to the locations shown in FIG. 1, and round baler 10 is ready to start another bale.

Figure 3:
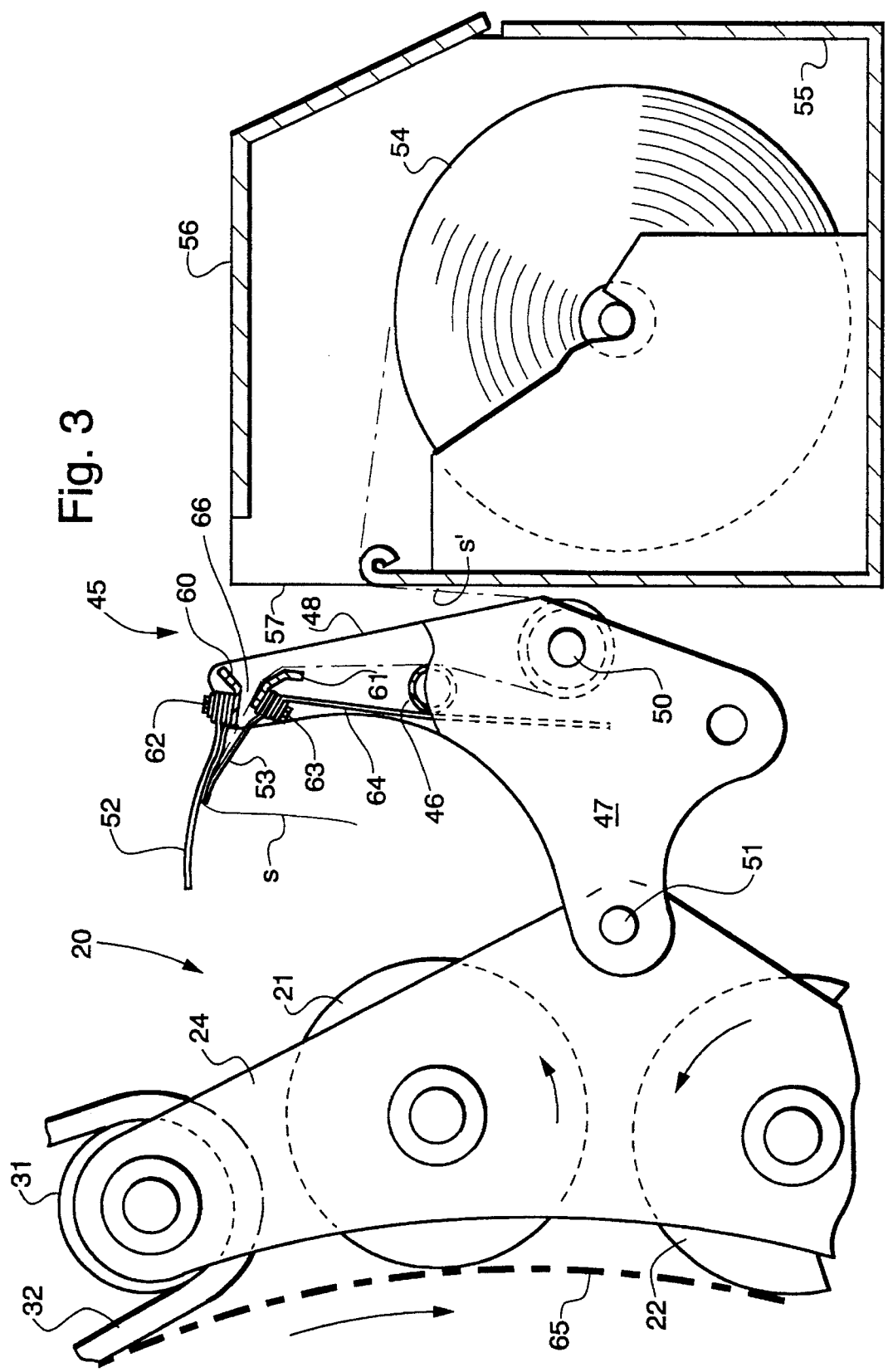
FIG. 3 is a detailed side elevational view of the net dispensing apparatus of the baler shown in FIGS. 1 and 2.
Figure 4:
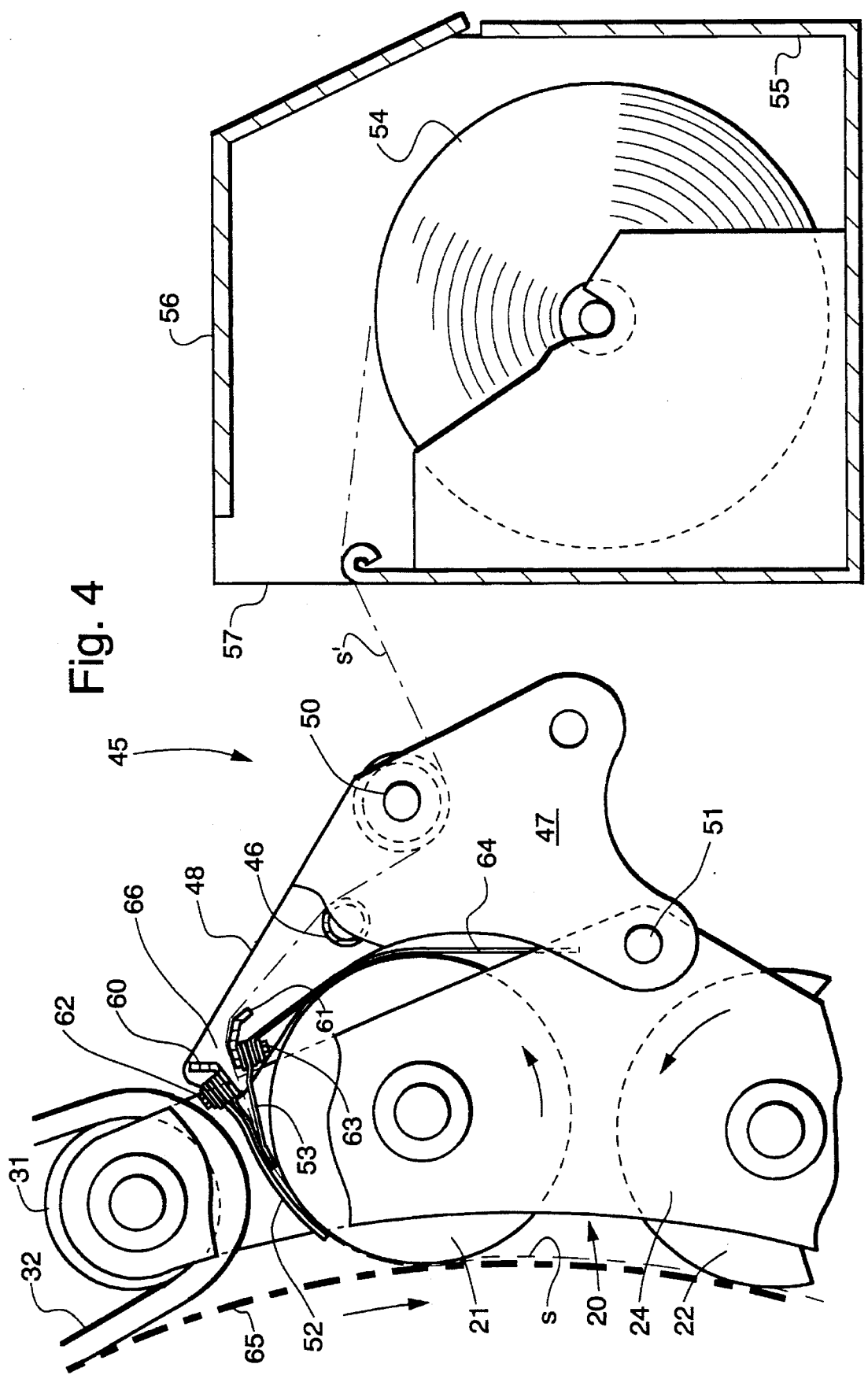
FIGS. 4 is also a side elevational view of the net dispensing apparatus shown in FIG. 3 and show the elements in their operational position.

Now turning to the bale wrapping system in which the present invention is embodied, FIG. 1 shows a net dispensing mechanism 45 pivotally mounted on sledge assembly 20. As best seen in FIGS. 3 and 4, dispensing mechanism 45 comprises a pair of levers 47, 48 spaced apart, inter alia, by a transverse idler roll 50, and a tubular support element 46. Levers 47, 48 are rotatably supported on a cross tube 51 that extends between arms 24 of sledge assembly 20. The dispensing mechanism 45 further comprises transverse clamping members 52, 53, also extending between levers 47, 48, arranged to dispense into the forming chamber sheet material s, such as net or the like, from a supply roll 54 disposed in a container 55 carried on the baler main frame 11. Container 55 has an access lid 56 for placement or removal of supply roll 54.

Clamping members 52, 53 are mounted on transverse guide members 60, 61 extending between levers 47, 48 by bolts 62, 63. Thus, as the sheet material s,s' is pulled from supply roll 54 via an opening 57 and guided to clamping members 52, 53 of dispensing mechanism 45, it passes under idler roller 50 which is mounted between and extends transversely of levers 47, 48.

Mounted on dispensing mechanism 45 is a baffle 64 comprising a rectangular flexible sheet secured along its upper edge to the front of clamping member 53 by bolt 63. Baffle 64, fabricated from material having characteristics similar to a rubber tire carcass, hangs in a generally vertical position when dispensing mechanism 45 is in the retracted position shown in FIG. 3. In this nonoperative position baffle 64 is in contact with or closely adjacent to support element 46. Under conditions where clamping members 52, 53 are inserted in the dispensing position shown in FIG. 4, baffle 64 is draped against roller 21.

Before describing the specific function of the baffle, which will illustrate its unique relationship with the net dispensing mechanism, the general operation of baler 10 will be described. First turning to the point at which a cylindrical package of crop material B has been formed and is ready to be wrapped with net material, as apron 32 continues to rotate B in a clockwise direction as viewed in FIG. 2. The outer surface of package B is generally illustrated by heavy broken lines 65 in FIGS. 2–4. Dispensing mechanism 45 is rotated from the position shown in FIG. 3 to position shown in FIG. 4. As the dispensing mechanism 45 moves toward its dispensing position (FIG. 4), clamping members 52, 53 move into the gap between roller 21 and apron 32. Meanwhile, a net brake element (not shown) is removed from the surface of supply roll 54 permitting the tail of the net material gripped between clamping members 52, 53 to be inserted through the gap into the bale forming chamber whereupon it is dragged downwardly and caught in the nip between roller 21 and package B which are rotating in opposite directions. The net material is then dispensed along a path from the supply roll 21 via opening 57, around idler roller 50, between clamping members 52, 53, and then through the gap into the bale forming chamber where it is wrapped circumferentially around package B while the bale continues to be rotated by apron 32. A minimum drag is maintained on the surface of supply roll 54 during dispensing. This net dispensing operation is described in U.S. Pat. No. 5,243,806, issued Sep. 14, 1993 in the name of Richard E. Jennings, et al, hereby incorporated by reference.

After package B has been wrapped with one or more layers of the net material, dispensing mechanism 45 is moved from the dispensing position shown in FIG. 4 to the retracted position shown in FIG. 3. After dispensing mechanism 45 has been retracted, a net cutting assembly is brought downwardly at the appropriate time into contact with the expanse of net material extending from clamping members 52, 53 of dispensing mechanism 45 to the periphery of roll 21. The net material s is cut in a known manner and leaves a succeeding tail which is held between clamping members 52, 53 for future insertion into the bale forming chamber when the next cylindrical package of crop material is ready to be wrapped with net material.

In operation, dispensing of net material s via clamping members 52, 53 uniformly across the width of the package of crop material is interrupted when the clamping force is not evenly distributed. When trash, such as crop residue, is permitted to enter the V shaped cavity 66 formed by the clamping members it is pulled into the clamping area by the moving net and interrupts the smooth clamping force applied to the net which in turn causes bunching, uneven feeding, net splitting and ultimately could obstruct the dispensing function. In the baler for which the present invention is an improvement it is not uncommon for a certain amount of debris such as crop particles to be dislodged from the outer surface of the cylindrical package as it is being rotated and expanded in the bale forming chamber. This debris if left unimpeded will be urged from the chamber via the outer surface of roller 21, for example, and randomly scatter toward the net under conditions where dispensing mechanism 45 is in its retracted position during formation of the hay package in the bale forming chamber. When debris lodges in the net in this manner, the subsequent dispensing function is fraught with the problems of interrupted dispensing discussed above. Baffle 64 obviates these problems by preventing the flow of debris from spaces in the chamber to the net as the bale is being formed.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention. For example, baffle 64 could be fabricated from a rigid material or, alternatively, a more flexible material, and regardless of the material, it could be attached in other areas, such as, the bottom edge or the two bottom corners.

Having thus described the invention, what is claimed is:

1. A round baler for forming crop material into cylindrical bales, said baler having a main frame, a tailgate pivotally connected to said main frame, a sledge assembly mounted on said main frame for movement between a bale starting position and a full bale position, said sledge assembly including conveying means having a crop engaging surface extending transversely of said main frame, an apron movably supported along a continuous path on said main frame and on said tailgate, said apron path having an inner course that cooperates with said conveying means on said sledge assembly to define a bale forming chamber, a pickup for feeding crop material into said chamber, and dispensing means carried on said sledge assembly for dispensing sheet material into said bale forming chamber so that said sheet material is wrapped circumferentially around a cylindrical package of crop material contained in said bale forming chamber to form a bale, said dispensing means pivotally mounted on said sledge assembly for movement between an extended position at which said sheet material is dispensed into said bale forming chamber and a retracted position, the improvement comprising baffle means mounted on said dispensing means, said baffle means disposed between said sheet material and said conveying means, under conditions where said dispensing means is in said retracted position, to shield said sheet material from stray crop material and other debris.

2. In a round baler as set forth in claim 1 wherein said sheet material comprises net wrapping material.

3. In a round baler as set forth in claim 2 wherein said dispensing means includes clamping means for frictionally engaging said net wrapping material during movement of said sledge assembly between said retracted position and said extended dispensing position.

4. In a round baler as set forth in claim 3 wherein said net wrapping material is guided along a predetermined path in the vicinity of said dispensing means prior to being dispensed into said bale forming chamber.

5. In a round baler as set forth in claim 4 wherein said clamping means extend into the peripheral area of said bale forming chamber in said extended position adjacent to said conveying means.

6. In a round baler as set forth in claim 5 wherein said conveying means comprise at least one transverse roller, and said baffle partially surrounds said one roller under conditions where said clamping means extends into the peripheral area of said bale forming area.

7. In a round baler as set forth in claim 6 wherein said baffle means comprises a rectangularly shaped curtain hanging in a generally vertical orientation under conditions where said dispensing means is in said retracted position.

8. In a round baler as set forth in claim 7 wherein said baffle is fabricated from a flexible material which permits it to conform to a portion of the outer surface of said roller with the bottom portion hanging downwardly under conditions where said baffle partially surrounds said at least one roller.

9. In a round baler as set forth in claim 1 wherein said baffle means comprises a rectangularly shaped curtain hanging in a generally vertical orientation under conditions where said dispensing means is in said retracted position.

10. In a round baler as set forth in claim 9 wherein said baffle is fabricated from a flexible material and is secured laterally to said dispensing means.

\* \* \* \* \*